(12) United States Patent
Nilsson et al.

(10) Patent No.: US 10,757,318 B2
(45) Date of Patent: Aug. 25, 2020

(54) DETERMINATION OF A CONTRAST VALUE FOR A DIGITAL IMAGE

(71) Applicant: Axis AB, Lund (SE)

(72) Inventors: Dennis Nilsson, Lund (SE); Björn Benderius, Lund (SE); Johan Jeppsson, Lund (SE); Johan Nyström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/220,906

(22) Filed: Dec. 14, 2018

(65) Prior Publication Data
US 2019/0199933 A1 Jun. 27, 2019

(30) Foreign Application Priority Data

Dec. 21, 2017 (EP) .................................... 17209253

(51) Int. Cl.
| H04N 5/232 | (2006.01) |
| G06T 5/00 | (2006.01) |
| G06T 7/12 | (2017.01) |
| G06T 7/13 | (2017.01) |

(52) U.S. Cl.
CPC ....... *H04N 5/232123* (2018.08); *G06T 5/002* (2013.01); *G06T 5/008* (2013.01); *G06T 7/12* (2017.01); *G06T 7/13* (2017.01); *H04N 5/23212* (2013.01)

(58) Field of Classification Search
CPC .......... H04N 5/232123; H04N 5/23212; G06T 7/12; G06T 7/13; G06T 5/002; G06T 5/008
See application file for complete search history.

(56) References Cited

U.S. PATENT DOCUMENTS

| 8,571,290 | B2 | 10/2013 | Wang et al. |
| 8,611,739 | B2 | 12/2013 | Honjo et al. |
| 2006/0062484 | A1* | 3/2006 | Aas .......................... G02B 7/36 |
| | | | 382/255 |

(Continued)

FOREIGN PATENT DOCUMENTS

| EP | 1624672 A1 | 2/2006 |
| WO | 2012/168766 A1 | 12/2012 |

OTHER PUBLICATIONS

Extended European Search Report dated Apr. 10, 2018 for the European Patent Application No. 17209253.8.

*Primary Examiner* — Nicholas G Giles
(74) *Attorney, Agent, or Firm* — Volpe and Koenig, P.C.

(57) ABSTRACT

A method for determining a local contrast value for a digital image captured by an image sensor in a camera comprising: applying an edge detection algorithm to image data of the digital image, thereby obtaining a data set pertaining to edges in the digital image; calculating, based on said data set, an edge occurrence value for the digital image; estimating, based on image data of the digital image and a noise model of the image sensor, an estimated image sensor noise for the digital image; and computing the local contrast value as a relationship between the edge occurrence value of the digital image and the expected edge occurrence value for the digital image. A method for adjusting a focus setting of a camera using the local contrast value for images captured by the camera.

15 Claims, 4 Drawing Sheets

(56) References Cited

U.S. PATENT DOCUMENTS

2007/0223817 A1\* 9/2007 Ulrich ................. G06K 9/6203
    382/199
2015/0269735 A1\* 9/2015 Tateno ................. G06K 9/4671
    382/153

\* cited by examiner

DETERMINATION OF A CONTRAST VALUE FOR A DIGITAL IMAGE

FIELD OF INVENTION

The present teachings relate to a method for determining a contrast value of a digital image. The present teachings also relate to methods for using the contrast value. One example of such a method is using the contrast value for adjusting a focus setting of a camera.

BACKGROUND

Within the field of camera surveillance, it is often of interest to determine sharpness or acutance of images. To do this, a contrast value is often used, under the logic that if the contrast of an image is relatively high then the image is probably sharp. This method has several problems. One is that it does not take into the account that high contrast globally over the picture may not indicate a sharp image— an image where one part is very bright, such as an image containing the daytime sky, may have very high contrast without being particularly well-focused. Another problem is that an image which is half black and half white has the same amount of contrast as an image of a checkerboard, while the latter clearly has more defined features. A third problem is that image sensor noise may provide false contrast, for example, uniform areas may contain high and/or low pixel values generated by image sensor noise, creating a contrast value which is difficult to use for adjustment of camera settings as it is disjunct from actual features or objects imaged by the camera. Another problem is that optical effects due to lens configuration and other characteristics of the camera may cause the image to be for example darker in areas closer to the edge of the image, affecting the contrast of the image even without any objects being present in the image at all. For at least these reasons, a better way of determining the visual sharpness or acutance of an image is needed.

SUMMARY

It is an object of the present teachings to mitigate at least some of the problems mentioned in the background.

According to a first aspect a method for determining a local contrast value for a digital image captured by an image sensor in a camera is provided. The method comprising: applying an edge detection algorithm to image data of the digital image, thereby obtaining a data set pertaining to edges in the digital image; calculating, based on said data set, an edge occurrence value for the digital image; estimating, based on image data of the digital image and a noise model of the image sensor, image sensor noise for the digital image; and computing the local contrast value as a relationship between the edge occurrence value of the digital image and a value based on the estimated image sensor noise.

This method enables determination of a contrast value which is based on the occurrence and clarity of edges in the image and their relationship to expected noise. This has the advantage of providing noise-insensitive information which can form a basis for adjustment of the camera. The present disclosure is based on the realization that commonly occurring phenomena (such as shadows) which may adversely affect contrast-to-noise measures based on pixel values in an image, may be filtered out partly or entirely by edge-finding algorithms. This is because edge-finding algorithms typically look at smaller clusters of pixels to find gradients in the image, which means that image-wide differences in luminance (such as large shadows) may be ignored by such algorithms.

It is important to note that the notion of contrast commonly used is one where differences in pixel values, such as, how much light has struck an area of the image sensor corresponding to the pixel, are considered. However, if for example a shadow lies over the image such that one half is considerably darker than the other half, measured traditional contrast values will be skewed considerably and any adjustment of the camera settings which preserve or enhance this difference in overall luminance in the image will be considered as contrast-enhancing when in fact, objects in the image may not be clearer or more visible. However, edge detection algorithms will typically find edges as clearly within the darker half as within the brighter one, and it follows that any adjustment of the camera settings which give rise to sharper edges will be a more "true" enhancement to human eyes. As edges emerge from local variances in pixel values, the contrast value thus obtained may be referred to as a local contrast value.

The edge detection algorithm may comprise a gradient operator such as a Sobel operator or Laplace operator.

Such gradient-based edge detection algorithms are known to be robust and computationally efficient as well as suitable for use with digital images.

The data set pertaining to edges in the digital image may comprise values indicating distinctiveness of edges, and wherein the calculation of the edge occurrence value may comprise calculating a sum of said values indicating distinctiveness of edges.

The image data of the digital image used for estimating the image sensor noise may comprise a sum of pixel values of the digital image.

The method may further comprise separating the image data into color channels, wherein the pixel values are taken from one or more of said color channels.

As edges may be as easily, or more easily, distinguished in a single color channel it is computationally more efficient to perform the calculations on a subset of the color channels.

Computing the local contrast value may comprise estimating, based on the estimated image sensor noise, an expected edge occurrence value, and then computing the local contrast value as a relationship between the edge occurrence value of the digital image and the estimated expected edge occurrence value. The relationship between the edge occurrence value of the digital image and the estimated expected edge occurrence value may, for example, be a ratio. By such a ratio between the edge occurrence value of the digital image and the estimated expected edge occurrence value the local contrast value will be 1.0 in case the image only comprises noise. Hence, it will be very convenient and easy to design algorithms using the in this way computed local contrast value. Further, a local contrast value calculated as the ratio between the edge occurrence value of the digital image and the estimated expected edge occurrence value will give an absolute measure of the contrast in an image. Further, together with calculating the variance over time at the local contrast value, it will be possible to directly estimate the amount of motion in a scene.

The method may further comprise segmenting the digital image into a set of regions, wherein the computation of a local contrast value is performed on each region of at least a subset of the set of regions of the digital image, thereby determining a plurality of local contrast values.

Segmenting the image may allow for parallel computing techniques to be used, thereby increasing computational efficiency by using for example different processor cores to perform the computations simultaneously on the different regions. A case may also arise where several objects are depicted at, for instance, different levels of sharpness because of a depth difference between the objects. In such a case, it may be advantageous to be able to find different local contrast values for different regions of the image as it would then be possible to, for example, adjust the focus of the camera to give a better representation of different objects at different depths.

The noise model of the image sensor may comprise predetermined data pertaining to characteristics of the image sensor.

If the characteristics of the image sensor are known, it is computationally advantageous to model the noise based on said known characteristics. In particular, a lookup table of expected values of noise in the image, for example at different light levels, may be computationally more efficient than calculating or measuring the amount of noise in the image.

The method may further comprise adjusting the noise model of the image sensor based on a setting of the image sensor, such as a gain and/or an exposure setting of the image sensor.

As gain and exposure settings typically affect noise levels in a digital image, noise levels at different settings may be measured beforehand and placed in a lookup table for computational efficiency, thereby decreasing calculation times. Shorter calculation times may be advantageous in real-time applications such as video surveillance.

The method may further comprise adjusting the noise model of the image sensor based on characteristics of the edge detection algorithm.

Different edge detection algorithms may give different results when applied to the same image with regards to many image characteristics, for example expected levels of noise. Pre-existing knowledge of the behavior of the edge detection algorithm with regards to noise may increase computational efficiency and/or precision of the noise model. Furthermore, some edge-detection algorithms are well-studied in regard to their reaction to noise—it is advantageous to use this knowledge when calculating the expected value of noise in the image.

The method may further comprise pre-processing image data of the digital image before determining a local contrast value, and adjusting the noise model based on characteristics of the pre-processing of the image data of the digital image.

Pre-processing such as noise reduction will obviously affect the expected value of noise in the image. Other pre-processing aiming to correct and/or improve the contents of the digital image may also affect the expected noise of the image. Knowledge of the behavior of the pre-processing steps with regards to noise in the image may therefore be used to improve the noise model with regards to computational efficiency and/or precision.

The relationship may comprise a ratio between the edge occurrence value and the expected edge occurrence value. The relationship may comprise a difference between the edge occurrence value and the expected edge occurrence value.

According to a second aspect a non-transitory computer readable storing medium is provided. The non-transitory computer readable storing medium having computer readable program code stored thereon which when executed on a device having processing capability is configured to perform the method according to the first aspect.

The above mentioned features of the method according to the first aspect, when applicable, apply to this second aspect as well. In order to avoid undue repetition, reference is made to the above.

According to a third aspect a circuitry configured to determine a local contrast value for a digital image captured by an image sensor in a camera is provided. The circuitry comprising: a memory configured to store image data of the digital image; an edge detector configured to apply an edge detection algorithm to image data of the digital image, thereby obtaining a data set pertaining to edges in the digital image; an edge occurrence value calculator configured to, based on said data set, calculate an edge occurrence value for the digital image; a noise estimator configured to, based on image data of the digital image and a noise model of the image sensor, estimate an image sensor noise for the digital image, and, based on the estimated image sensor noise for the digital image, estimate an expected edge occurrence value; and a local contrast value determinator configured to compute the local contrast value as a relationship between the edge occurrence value of the digital image and the expected edge occurrence value for the digital image.

The above mentioned features of the method according to the first aspect, when applicable, apply to this third aspect as well. In order to avoid undue repetition, reference is made to the above.

According to a fourth aspect a method for adjusting a focus setting of a camera is provided. The method comprising: capturing, by an image sensor of the camera, an image series comprising at least two images, each image of the image series being captured using a different focus setting of the camera; determining a local contrast value of each image of the image series by the method according to the first aspect; selecting a focus setting of the camera by comparing the local contrast values of the images in the image series; and adjusting the focus setting of the camera based on the selected focus setting.

Such a method is advantageous over other, known methods because the local contrast value obtained is based on the occurrence and clarity of edges in the image and their relationship to expected noise. This has the advantage of providing noise-insensitive information which can form a basis for adjustment of a focus setting of the camera which is insensitive to large differences of luminance in the image which may not actually give rise to contrast in the image. For instance, shadows may affect the contrast of the image as a whole. An increase or decrease, in the thus affected contrast, may not be indicative of the relative contrast provided by depicted objects in the image, and may thus worsen attempts to adjust settings of the camera based on the contrast value.

The act of selecting a focus setting may comprise selecting a focus setting of the camera indicative of having obtained a locally maximized local contrast value. The act of selecting a focus setting of the camera indicative of having obtained a locally maximized local contrast value may be achieved using a hill climbing algorithm.

Hill climbing algorithms are computationally efficient and suitable for finding a local maximum (or minimum) of functions expected to behave smoothly, such as the contrast of images taken by a camera at different focus settings.

The method may further comprise determining locally maximized local contrast values for at least a subset of regions of the digital image and comparing the determined local contrast values with each other.

In this way, objects at different distances from the camera (and thus, at different depths in the image) may be enhanced.

According to a fifth aspect a focus adjustable digital camera is provided. The camera comprising: a memory configured to store image data pertaining to a series of images captured by the camera, each image of the image series being captured using a different focus setting of the camera; a circuitry, according to the third aspect, configured to determine a local contrast value of each image of the series of images; a processor configured to: compare the local contrast values for the images of the series of images, and select a focus setting of the digital camera based on the comparison; and a controller configured to adjust the focus setting of the digital camera based on the selected focus setting.

The above mentioned features of the method according to the fourth aspect, when applicable, apply to this fifth aspect as well. In order to avoid undue repetition, reference is made to the above.

A further scope of applicability of the present teachings will become apparent from the detailed description given below. However, it should be understood that the detailed description and specific examples, while indicating embodiments of the present teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present teachings will now be described in more detail, with reference to appended drawings showing embodiments of the present teachings. The figures should not be considered limiting the present teachings to the specific embodiment; instead they are used for explaining and understanding the present teachings.

As illustrated in the figures, the sizes of layers and regions are exaggerated for illustrative purposes and, thus, are provided to illustrate the general structures of embodiments of the present teachings. Like reference numerals refer to like elements throughout.

DETAILED DESCRIPTION

The present teachings will now be described more fully hereinafter with reference to the accompanying drawings, in which embodiments of the present teachings are shown. The present teachings may, however, be embodied in many different forms and should not be construed as limited to the embodiments set forth herein; rather, these embodiments are provided for thoroughness and completeness, and to fully convey the scope of the present teachings to the skilled person.

Figure 1:
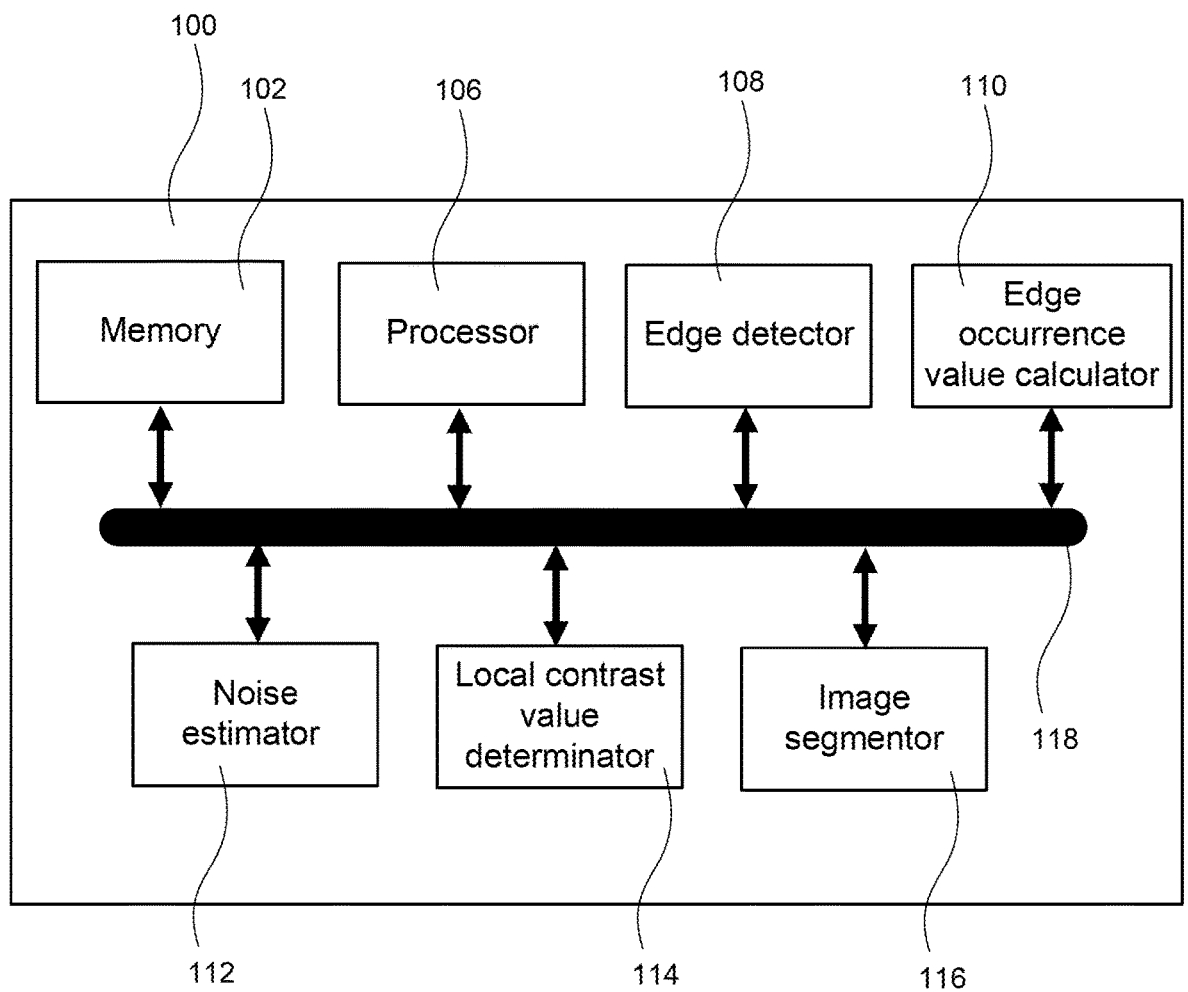
FIG. 1 is a block diagram of a circuitry configured to determine a local contrast value for a digital image captured by an image sensor in a camera.

FIG. 1 illustrates a circuitry 100 configured to determine a local contrast value for a digital image captured by an image sensor in a camera. The circuitry 100 may be arranged in a device separate from the camera. If so, the device may be configured to receive data from the camera via a digital network. However, for most implementations the circuitry 100 is comprised in the camera itself.

The circuitry 100 comprises a memory 104, an edge detector 108, an edge occurrence value calculator 110, a noise estimator 112, a local contrast value determinator 114. The circuitry may further comprise an image segmentor 116. The circuitry 100 may further comprise one or more processors 106. Each of the one or more processors 106 may be a single core processor or a multicore processor. Each of the one or more processors 106 may be any suitable processor for performing digital data processing.

Any one of the edge detector 108, the edge occurrence value calculator 110, the noise estimator 112, the local contrast value determinator 114 and the image segmentor 116 may be implemented as a dedicated hardware circuit and/or software module. In case of being a software module the software may be run on the one or more processors 106. It shall also be noted that any dedicated hardware circuit may in part comprise software portions being run on the one or more processors 106.

The memory 104 may be any kind of volatile or non-volatile memory. Further, the memory 104 may comprise a plurality of memory units. At least one of the plurality of memory units may be used as a buffer memory for buffering data while performing processing by the one or more processors 106.

The memory 104, the one or more processors 106, the edge detector 108, the edge occurrence value calculator 110, the noise estimator 112, the local contrast value determinator 114 and/or the image segmentor 116 may be arranged to communicate with each other over a data bus 118.

The memory 104 may be configured to store image data of a digital image captured by a digital camera. According to a non-limiting example, the digital image consists of three pixel values per pixel, representing the presence of red, green and blue light, respectively. The image may have additional or alternative channels, such as infra-red and visible light. The image may alternately be monochrome. The memory 104 may be configured to store look-up tables related to noise of the image sensor. The memory 104 may be configured to store camera settings of previously captured images. Examples of camera settings of previously captured images are focus settings, gain setting of the image sensor, settings for encoding the images, etc.

The local contrast value may be determined using one or more of the channels. According to a non-limiting example only one channel is used, for example, the green channel. However, another channel than the green channel may be used. Further, a subset or even all of the channels may be used.

The edge detector 108 is configured to apply an edge detection algorithm to image data of the digital image. The image data onto which the edge detection algorithm is applied may be image data representing the whole of the area of the digital image. The image data onto which the edge detection algorithm is applied may be image data of one or more regions of the digital image.

The image segmentor 116 is configured to segment the image into image regions. Each image region comprises spatially related image data, that is, data pertaining to a sub-area of the total area of the digital image. The image regions may be tiled. The image regions may cover the entire image. The image regions may be rectangular, hexagonally or circular shaped. However, other shapes of the image regions may also be used. The image regions might, however, not cover the entire digital image. The image regions may be not tiled. For example, one or more, possibly disjunct, regions of interest may be indicated by the user. These regions of interest might not cover the entire image. The region of interest may have any shape. For example, a region of interest may be rectangular, hexagonally or circular.

By applying the edge detection algorithm to image data of the digital image a data set pertaining to edges in the digital image is obtained.

In case of segmenting the digital image into a plurality of image regions the edge detection algorithm is applied on one or more of the image regions. As mentioned above the edge detection algorithm may be applied to image data representing the whole of the area of the digital image.

The edge detection algorithm comprises a gradient operator such as a Sobel operator or Laplace operator. For example, an edge detection algorithm comprising a Sobel operator may be seen as a Sobel filter. The Sobel filter is a gradient-based filter which returns large values if there is a sharp edge between neighboring pixels and small values if neighboring pixels have similar pixel values. An edge detection algorithm comprising a Laplace operator may be seen as a Laplacian filter. The Laplacian filter is a gradient-based filter which returns a positive value on one side of an edge and a negative value on the other side of the edge with a zero on the edge between these two regions, where the difference between these sides immediately adjacent to the zero may be an indication of the sharpness of the edge. Hence, the values obtained from the edge detection algorithm are indicative of local contrast in the image, that is, contrast between neighboring areas of image data. Hence, by applying an edge detection algorithm to image data of the digital image, a data set pertaining to edges in the digital image is obtained. The data set pertaining to edges of the digital image comprises values indicating distinctiveness of edges.

The edge occurrence value calculator 110 is configured to calculate an edge occurrence value using the data set pertaining to edges in the digital image. In case of segmenting the digital image into image regions, edge occurrence values for one or more of the image regions may be calculated. An edge occurrence value may be calculated by summing the values indicating distinctiveness of edges. The summing may be made using absolute values of the data set pertaining to edges. A normalization may also be made using the number of pixels in the respective image region. As relatively large values indicating distinctiveness of edges indicate sharp edges and relatively small values indicating distinctiveness of edges indicate soft or few edges, the sum of these values indicate both sharpness and occurrence of edges in the digital image as a whole or in the respective image region. The number of pixels in the image region is related to the area of the digital image covered by the image region. Therefore, the normalized value gives an indication of the presence as well as the relative occurrence of edges. The edge occurrence value is relatively large if there are many, or sharp, edges. The edge occurrence value is relatively small if there are few or soft edges.

The noise estimator 112 is configured to estimate a value of image sensor noise from the image sensor used for capturing the digital image. The estimation is based on a noise model of the image sensor used for capturing the digital image. The estimation is based on various known or measured parameters. Noise in the digital image may give rise to falsely detected edges, and may thus increase the edge occurrence value and create inaccuracy. The noise model takes the digital image as input to evaluate the light conditions under which the image was captured. The light conditions will typically influence the amount of ambient noise picked up by the image sensor. The light conditions may of course be measured in another way, such as with an external light sensor, roughly by a clock indicating the time of day or other methods. The noise model may also take into account metadata regarding the image sensor, such as type, placement with regards to the lens, and other characteristics. Furthermore, the noise model may depend on sensor settings such as gain or exposure, as these also affect signal noise. Simpler or other noise models are of course also possible. However, the noise model shall be configured to return an expected value of noise present in the digital image. The noise model may be in the form of a lookup table of pre-determined noise data tabulated against parameters relevant to the expected signal noise of the image sensor. Alternatively, or in combination, the noise model may be based on a mathematical function or algorithm. Alternatively, or in combination, the noise model may be based on a scan of the digital image finding contrasts consisting of a few clustered pixels indicative of that said contrasts are in fact noise, and from such a scan approximate the noise in the image. The estimated image sensor noise is then used to produce an expected edge occurrence value. This may be done by for example using known characteristics of the edge detection algorithm together with the estimated image sensor noise to produce the expected edge occurrence value.

The local contrast value determinator 114 is configured to determine a local contrast value for the digital image. The local contrast value is a relationship between the edge occurrence value of the digital image, or each region of the digital image, and the estimated image sensor noise for the entire digital image or for the respective region of the digital image. The relationship may, for example, be formed by dividing the edge occurrence value by the expected value of noise for the entire digital image or for the one or more image regions of the digital image. The local contrast value will be relatively small if there are few detected edges, if the edges are very soft, or if there is a great deal of noise in the image relative to the occurrence of edges. The local contrast value will be relatively large if there are many and/or sharp edges, or if there is little noise relative to the occurrence of edges.

For some cases a single local contrast value may be desired for representing the entire image. This may for example be desirable when adjusting a setting of the camera which affects the entire image. An example of such a setting is focus of the camera. A single local contrast value may be selected for the entire picture by a number of techniques. Alternatively, one out of many local contrast values for a digital image may be used. For instance, a "weighted vote", where local contrast values are compared to each other with those near the center of the image or in a region of interest as selected by the user being prioritized, may be used. It is also possible to consider image regions with higher edge occurrence values as prioritized, as these are more likely to contain interesting objects. A third option would be to use images taken previously to determine if there is any change in an image region of the image, and consider this image region as prioritized for the purpose of selecting a local contrast value, as there is probably movement in said image region. Another option would be to use some mean, weighted or arithmetic, between the local contrast values.

Figure 2:
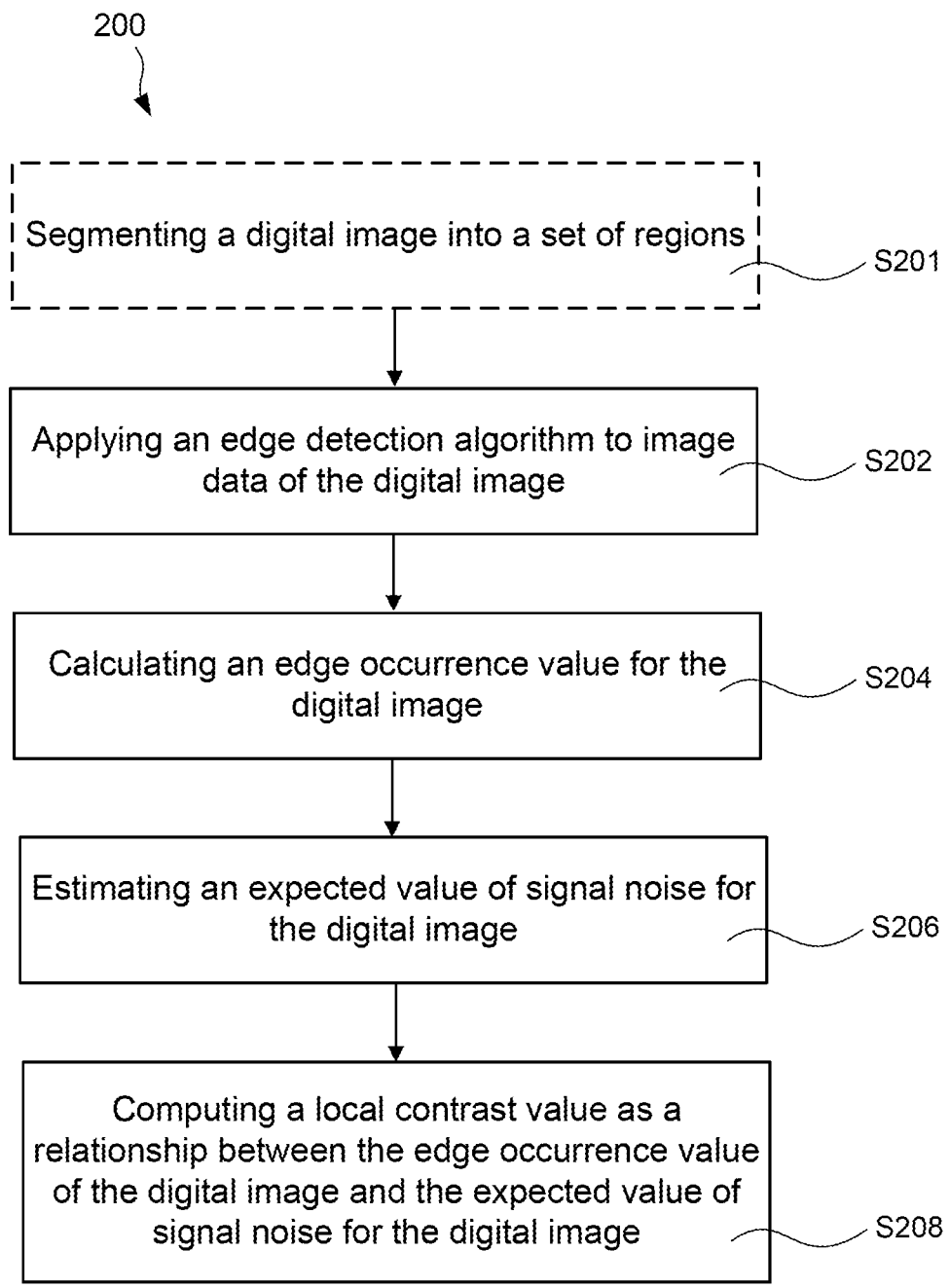
FIG. 2 is a flow diagram of a method for determining a local contrast value.

FIG. 2 is a flow diagram of a method 200 for determining a local contrast value for a digital image captured by an image sensor in a camera. The method comprises the following acts: Applying S202 an edge detection algorithm to image data of the digital image. By this a data set pertaining to edges in the digital image is obtained. The edge detection algorithm may comprise a gradient operator such as a Sobel operator or Laplace operator. The data set pertaining to edges in the digital image may comprise values indicating distinctiveness of edges. Calculating S204, based on said data set, an edge occurrence value for the digital image. The calculation of the edge occurrence value may comprise calculating a sum of said values indicating distinctiveness of edges. Estimating S206, based on image data of the digital image and a noise model of the image sensor, a value of estimated image sensor noise for the digital image. The estimated image sensor noise for the digital image are the used for estimating an expected value of edge occurrence. The noise model of the image sensor may comprise predetermined data pertaining to characteristics of the image sensor. The noise model of the image sensor may be adjusted based on a setting of the image sensor, such as a gain and/or an exposure setting of the image sensor. The noise model of the image sensor may be adjusted based on characteristics of the edge detection algorithm. The noise model may be adjusted based on characteristics of a pre-processing of the image data of the digital image. And computing S208 the local contrast value as a relationship between the edge occurrence value of the digital image and the expected edge occurrence value for the digital image. The relationship may comprise a ratio between the edge occurrence value and the expected value.

The method may further comprise comprising segmenting S201 the digital image into a set of regions, wherein the acts S202, S204, S206 and S208 are performed on each region of at least a subset of the set of regions of the digital image, thereby determining a plurality of local contrast values.

The different acts S201, S202, S204, S206 and S208 are discussed more in detail above in connection with the circuitry 100 configured to determine a local contrast value for a digital image captured by an image sensor in a camera. In order to avoid undue repetition, reference is made to the above.

Figure 3:
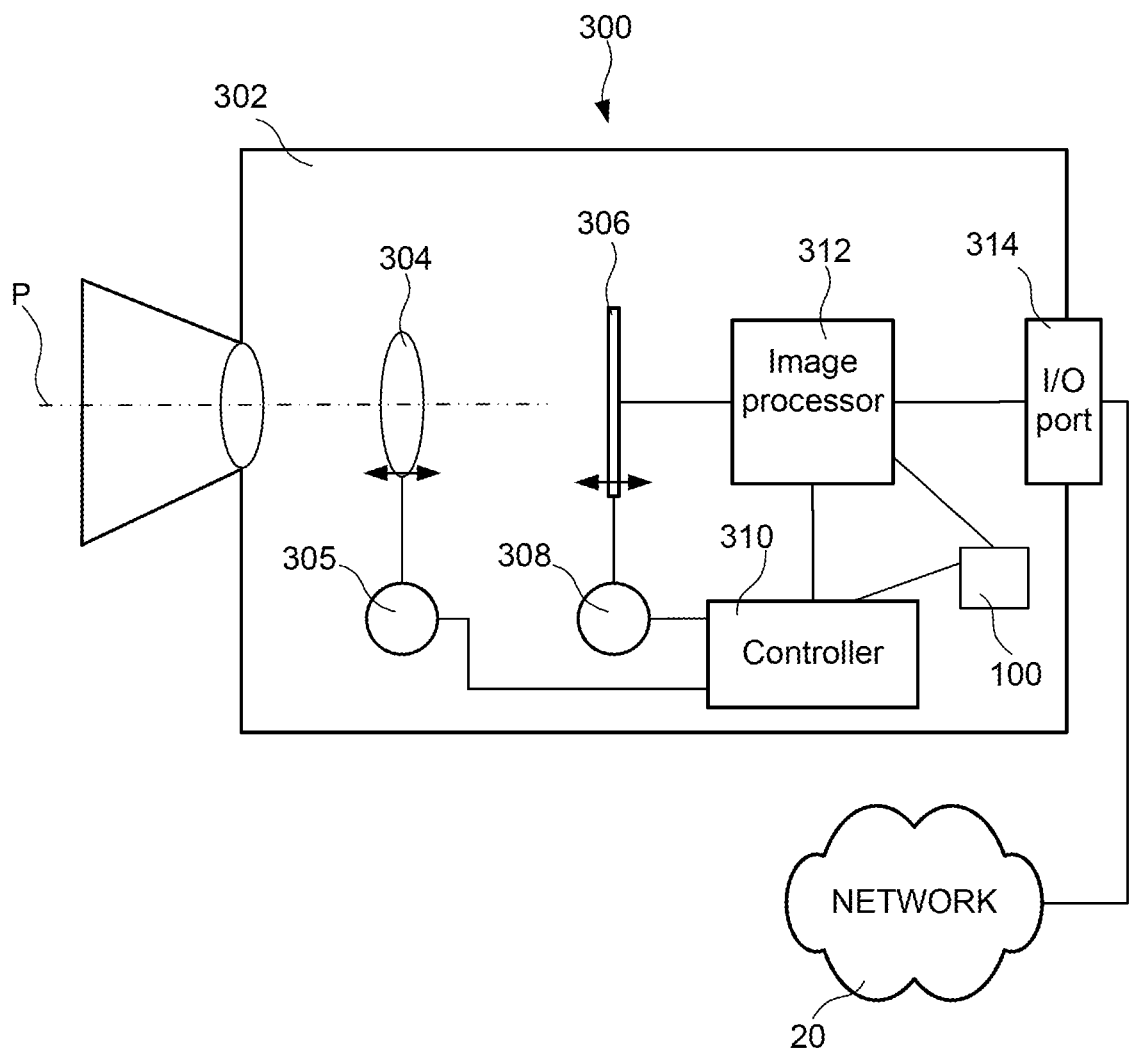
FIG. 3 is a block diagram of a focus adjustable digital camera.

FIG. 3 is a schematic block view of a digital camera 300. The digital camera 300 may, for example, be a monitoring camera. The digital camera 300 is arranged to capture digital images depicting a scene. The digital images may be used for composing a video sequence of the scene. The digital camera 300 comprises a housing 302, a focusing lens 304, a focus motor 305, an image sensor 306, a controller 310, an image processor 312 and the circuitry 100 discussed above. The digital camera 300 may further comprise an I/O-port 314. The digital camera 300 may be connected to a digital network 20 through the I/O-port 314. The digital camera 300 is arranged to capture and process (and possibly also store) the digital images.

The camera components, such as, the focusing lens 304 and the image sensor 306, is arranged to capture image data. The digital camera 300 may be a camera arranged to capture photographical images. Alternatively, or in combination, the digital camera 300 may be arranged to capture thermal images. Yet alternatively, or in combination, the digital camera 300 may be arranged to capture radar images. Hence, the video sequence captured by the digital camera 300 may be a representation of photographical images, a representation of thermal images, a representation of radar images or a combination thereof.

The focusing lens 304 is movable along an optical path P. Moving the focusing lens 304 along the optical path P will result in images registered by the digital camera 300 having different focus. Hence, the digital camera 300 may be set in different focus settings. The focus motor 305 is configured to move the focusing lens 304 along the optical path P. The focus motor 305 is connected to and controlled by the controller 310.

Alternatively, or in combination, the image sensor 306 may be movable along an optical path P. Moving the image sensor 306 along the optical path P will result in images registered by the digital camera 300 having different focus. Hence, the digital camera 300 may be set in different focus settings. The actuator 308 is configured to move the image sensor 306 along the optical path P. The actuator 308 is connected to and controlled by the controller 310. Non-limiting examples of actuators are electrical motors, linear actuators or piezoelectric actuators.

It is possible to change the focus of the digital camera 300 in other ways. For example, it is possible to make the lens 304 out of a flexible material and change the focus of the camera by deforming the lens 304. Other ways of changing the focus of the digital camera 300 as a result of changing a focus setting of the digital camera 300 are also possible.

The digital camera 300 is configured to capture a series of images. The image series comprising at least two images. Each image of the image series being captured using a different focus setting of the digital camera 300.

Image data pertaining to the images of the series of images is stored in the memory 102 of the circuitry 100. The different focus settings may be stored in the memory 102 of the circuitry 100. The stored different focus settings may be associated with image data of the respective image captured using that specific focus setting.

The circuitry 100 is configured to determine a local contrast value of each image of the series of images. The local contrast value of each image is indicative of visual clarity of the respective image. According to a non-limiting example, a single local contrast value is determined for each image. However, in case the images are segmented into image regions a local contrast value for one or more of the image regions may be determined.

The local contrast values for the images of the series of images are thereafter compared. The comparison may be made by the one or more processors 106 of the circuitry 100, by the image processor 312 and/or by the controller 310. Based on the comparison of the local contrast values for the images of the series of images a focus setting of the digital camera 300 is selected. The selection may be made by the one or more processors 106 of the circuitry 100, by the image processor 312 and/or by the controller 310. The selection may be indicative of having obtained a locally maximized local contrast value. A check of having obtained a locally maximized local contrast value may be made using a hill climbing algorithm.

The controller 310 is configured to adjust the focus setting of the digital camera 300 based on the selected focus setting. The controller 310 is configured to adjust the focus setting of the digital camera by controlling the focus motor 305 and/or the actuator 308, and/or by any other means for changing focus of the digital camera 300. A focus setting among the focus settings used to capture one of the images in the series of images may be used. Alternatively, a focus setting in between two neighboring focus settings used to capture two different images in the series of images may be used. This is particularly useful if two images were to have similar local contrast values. For such cases it is probable that a focus setting in between the two neighboring focus settings is a better focus setting.

Figure 4:
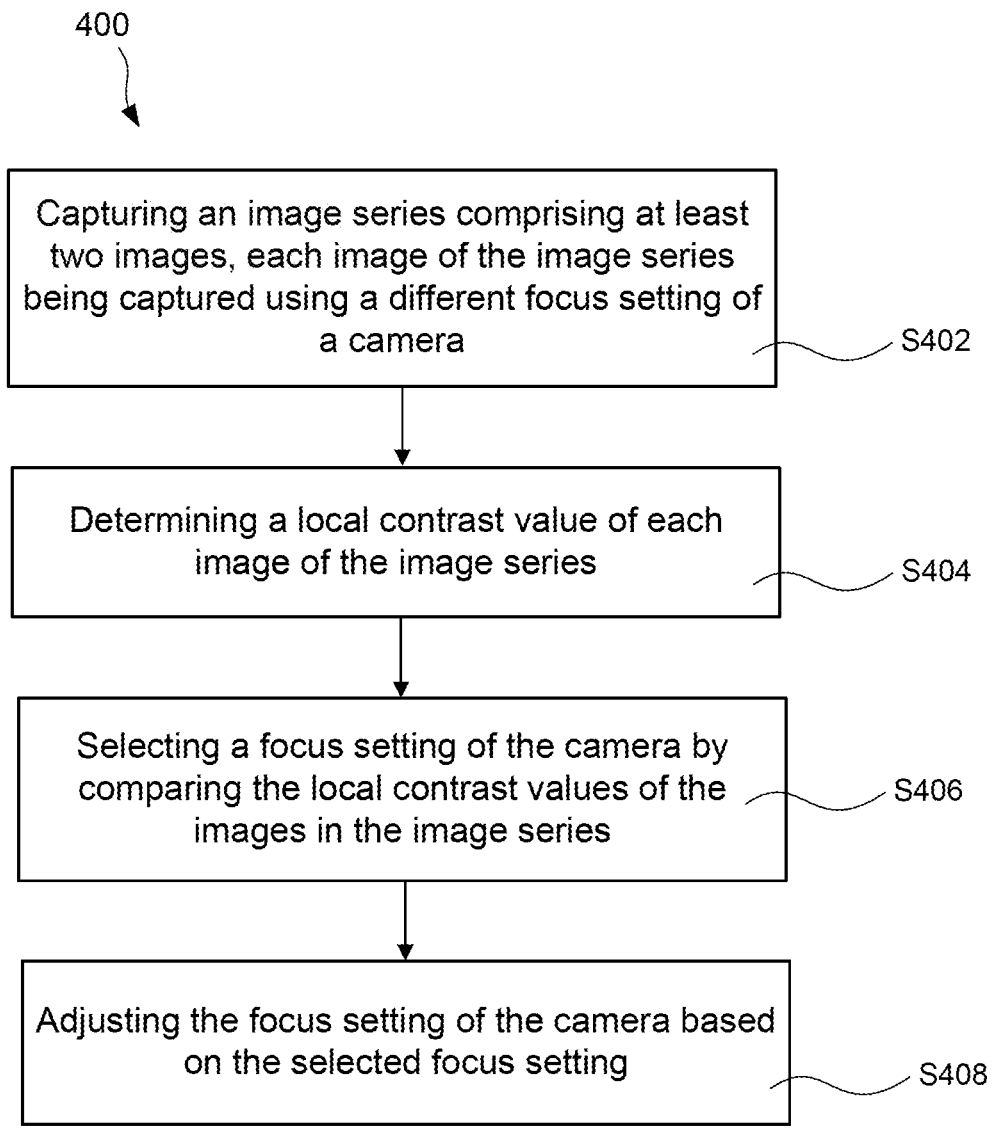
FIG. 4 is a flow diagram of a method to adjust a focus setting of a digital camera.

FIG. 4 is a flow diagram of a method 400 for adjusting a focus setting of a camera. The method comprises the following acts: Capturing S402, by an image sensor of the camera, an image series. The image series comprising at least two images. Each image of the image series being captured using a different focus setting of the camera. The camera may be set in the different focus settings by, for example, adjusting the focusing lens of the camera and/or adjusting a position of the image sensor. Determining S404 a local contrast value of each image of the image series by the method discussed in combination with FIG. 2. Selecting S406 a focus setting of the camera by comparing the local contrast values of the images in the image series. The selection of the focus setting of the camera may be indicative of having obtained a locally maximized local contrast value. The locally maximized local contrast value may be selected using a hill climbing algorithm. And adjusting S408 the focus setting of the camera based on the selected focus setting.

The method may further comprise determining locally maximized local contrast values for at least a subset of regions of the digital image and comparing the determined local contrast values with each other.

The person skilled in the art realizes that the present teachings by no means are limited to the embodiments described above. On the contrary, many modifications and variations are possible within the scope of the appended claims.

For example, the digital image may be pre-processed before the methods described above are performed. For example, the image may have been noise filtered to reduce the amount of ambient noise present in the image. According to another example the image may have been pre-processed to compensate for optical effects present near the edges of the image. An example, of such a pre-processing is to remove, or at least reduce, the effect of vignetting. Also other kind of pre-processing may have been introduced to the image data before performing any of the methods discussed in this disclosure. In case of pre-processing the image data, the noise model of step S206 may be configured to adjust the expected value returned based on pre-determined knowledge of how noise levels are affected by such pre-processing.

Further, the relationship between the edge occurrence value of each region of the digital image and the expected edge occurrence value may be computed using a different mathematical method than division. For example, subtraction or other methods and/or algorithms may be used.

The local contrast value for an image in the series of images used during adjustment of focus of the digital camera may be used for scaling a size of a focus search step. A relatively low value of the local contrast value for an image in the series of images is indicative of that the digital camera is out of focus and a relatively large step may be made for the focus setting before capturing a next image in the series of images. Further, a relatively high value of the local contrast value for an image in the series of images is indicative of that the digital camera is in focus or very close to be in focus, hence, a relatively small step may be made for the focus setting before capturing a next image in the series of images. This may shorten the search time to find focus.

As discussed above the local contrast value may be used in adjusting focus of a camera. However, the local contrast value may as well be used in other processes. Some of these processes are directed towards optimizing image quality in images captured by the camera. Examples wherein the local contrast value may be used are in adjusting an exposure time of a camera, an iris position of a camera, and/or image sensor gain settings of a camera.

The local contrast value may also be seen as an estimated measure of motion in a scene, hence, the local contrast value may be used for setting a level of compression for a video stream captured by a camera. Together with a temporal measuring technique such as pixel variance over time, the real motion from the scene can be separated from the motion contribution from noise.

The local contrast value may also be used in setting a noise filtering level.

Additionally, variations to the disclosed embodiments can be understood and effected by the skilled person in practicing the present teachings, from a study of the drawings, the disclosure, and the appended claims.

What is claimed is:

1. A method for determining a local contrast value for a digital image captured by an image sensor in a camera, the method comprising:
    applying an edge detection algorithm to image data of the digital image, thereby obtaining a data set pertaining to edges in the digital image;
    calculating, based on said data set, an edge occurrence value for the digital image;
    estimating, based on image data of the digital image and a noise model of the image sensor, image sensor noise for the digital image;
    estimating, based on the estimated image sensor noise, an expected value of edge occurrence; and
    computing the local contrast value as a relationship between the edge occurrence value of the digital image and the estimated expected value of edge occurrence.

2. The method of claim 1, wherein the data set pertaining to edges in the digital image comprises values indicating distinctiveness of edges, and wherein the calculation of the edge occurrence value comprises calculating a sum of said values indicating distinctiveness of edges.

3. The method of claim 1, wherein the image data of the digital image used for estimating the image sensor noise comprises a sum of pixel values of the digital image.

4. The method of claim 3, further comprising separating the image data into color channels, wherein the pixel values are taken from one of said color channels.

5. The method of claim 1, further comprising segmenting the digital image into a set of regions, wherein the acts of claim 1 are performed on each region of at least a subset of the set of regions of the digital image, thereby determining a plurality of local contrast values.

6. The method of claim 1, wherein the noise model of the image sensor comprises predetermined data pertaining to characteristics of the image sensor.

7. The method of claim 1, further comprising adjusting the noise model of the image sensor based on a setting of the image sensor, such as a gain and/or an exposure setting of the image sensor.

8. The method of claim 1, further comprising adjusting the noise model of the image sensor based on characteristics of the edge detection algorithm.

9. The method of claim 1, further comprising:
pre-processing image data of the digital image before determining a local contrast value; and
adjusting the noise model based on characteristics of the pre-processing of the image data of the digital image.

10. The method of claim 1, wherein the relationship comprises one or more of a ratio between the edge occurrence value and the expected value and a difference between the edge occurrence value and the expected value.

11. A non-transitory computer readable storage medium including instructions which, when executed by a device having a processing capability, cause the device to execute instructions for determining a local contrast value for a digital image captured by an image sensor in a camera, the instructions causing the device to perform operations comprising:
applying an edge detection algorithm to image data of the digital image, thereby obtaining a data set pertaining to edges in the digital image;
calculating, based on said data set, an edge occurrence value for the digital image;
estimating, based on image data of the digital image and a noise model of the image sensor, image sensor noise for the digital image;
estimating, based on the estimated image sensor noise, an expected value of edge occurrence; and
computing the local contrast value as a relationship between the edge occurrence value of the digital image and the estimated expected value of edge occurrence.

12. A circuitry configured to determine a local contrast value for a digital image captured by an image sensor in a camera, the circuitry comprising:
a memory configured to store image data of the digital image; and
a circuitry configured to:
apply an edge detection algorithm to image data of the digital image, thereby obtaining a data set pertaining to edges in the digital image;
based on said data set, calculate an edge occurrence value for the digital image;
based on image data of the digital image and a noise model of the image sensor, estimate a value of image sensor noise for the digital image, and, based on the estimated image sensor noise for the digital image, estimate an expected edge occurrence value; and
compute the local contrast value as a relationship between the edge occurrence value of the digital image and the estimated expected value of edge occurrence.

13. A method for adjusting a focus setting of a camera, the method comprising:
capturing, by an image sensor of the camera, an image series comprising at least two images, each image of the image series being captured using a different focus setting of the camera;
determining a local contrast value of each image of the image series by the method according to claim 1;
selecting a focus setting of the camera by comparing the local contrast values of the images in the image series; and
adjusting the focus setting of the camera based on the selected focus setting.

14. The method of claim 13, further comprising segmenting each of the images in the image series into a set of regions, wherein the act of determining a local contrast value of each image of the image series comprises determining a local contrast value for at least a subset of the set of regions of each of the images in the image series.

15. A focus adjustable digital camera, the camera comprising:
a memory configured to store image data pertaining to a series of images captured by the camera, each image of the image series being captured using a different focus setting of the camera;
a circuitry configured to determine a local contrast value of each image of the series of images, the circuitry comprising:
a memory configured to store image data of the digital image; and
a circuitary to:
apply an edge detection algorithm to image data of the digital image, thereby obtaining a data set pertaining to edges in the digital image;
based on said data set, calculate an edge occurrence value for the digital image;
based on image data of the digital image and a noise model of the image sensor, estimate a value of image sensor noise for the digital image, and, based on the estimated image sensor noise for the digital image, estimate an expected edge occurrence value; and
compute the local contrast value as a relationship between the edge occurrence value of the digital image and the estimated expected value of edge occurrence.
a processor configured to:
compare the local contrast values for the images of the series of images; and
select a focus setting of the digital camera based on the comparison; and
a controller configured to adjust the focus setting of the digital camera based on the selected focus setting.

* * * * *